United States Patent
Ginzburg et al.

(10) Patent No.: US 8,984,043 B2
(45) Date of Patent: Mar. 17, 2015

(54) MULTIPLYING AND ADDING MATRICES

(75) Inventors: Boris Ginzburg, Haifa (IL); Simon Rubanovich, Haifa (IL); Benny Eitan, Haifa (IL)

(73) Assignee: Intel Corporation, Santa Clara, CA (US)

( * ) Notice: Subject to any disclaimer, the term of this patent is extended or adjusted under 35 U.S.C. 154(b) by 931 days.

(21) Appl. No.: 12/965,657

(22) Filed: Dec. 10, 2010

(65) Prior Publication Data

US 2011/0153707 A1   Jun. 23, 2011

Related U.S. Application Data

(60) Provisional application No. 61/289,517, filed on Dec. 23, 2009.

(51) Int. Cl.
  *G06F 7/52*   (2006.01)
  *G06F 17/16*   (2006.01)
  *G06F 9/30*   (2006.01)

(52) U.S. Cl.
  CPC ............. *G06F 17/16* (2013.01); *G06F 9/3001* (2013.01); *G06F 9/30036* (2013.01)
  USPC ........................................................ 708/607

(58) Field of Classification Search
  CPC ........................................................ G06F 17/16
  USPC ................................................. 708/520, 607
  See application file for complete search history.

(56) References Cited

U.S. PATENT DOCUMENTS

| | | | | |
|---|---|---|---|---|
| 5,235,536 | A * | 8/1993 | Matsubishi et al. | 708/524 |
| 6,901,422 | B1 * | 5/2005 | Sazegari | 708/607 |
| 2003/0088600 | A1 * | 5/2003 | Lao et al. | 708/520 |
| 2008/0284915 | A1 * | 11/2008 | Figueroa et al. | 348/649 |
| 2010/0325187 | A1 * | 12/2010 | Juffa et al. | 708/607 |

OTHER PUBLICATIONS

Intrinsity, FastMath Overview, 2002.*

* cited by examiner

*Primary Examiner* — Chuong D Ngo
(74) *Attorney, Agent, or Firm* — Blakely, Sokoloff, Taylor & Zafman LLP (57) ABSTRACT

An apparatus and method are described for multiplying and adding matrices. For example, one embodiment of a method comprises decoding by a decoder in a processor device, a single instruction specifying an m-by-m matrix operation for a set of vectors, wherein each vector represents an m-by-m matrix of data elements and m is greater than one; issuing the single instruction for execution by an execution unit in the processor device; and responsive to the execution of the single instruction, generating a resultant vector, wherein the resultant vector represents an m-by-m matrix of data elements.

15 Claims, 7 Drawing Sheets

MULTIPLYING AND ADDING MATRICES

CLAIM TO PRIORITY

This Application claims the benefit of U.S. Provisional Patent Application No. 61/289,517, filed on Dec. 23, 2009, entitled "Multiplying and Adding Matrices."

FIELD OF THE INVENTION

This disclosure relates to microprocessors and other processing devices and, more particularly, to two-dimensional matrix multiplication.

BACKGROUND

To improve the efficiency of multimedia applications, as well as other applications with similar characteristics, Single Instruction, Multiple Data (SIMD) architectures have been implemented in microprocessor systems to enable one instruction to operate on several operands in parallel. In particular, SIMD architectures take advantage of packing many data elements within one register or contiguous memory location. With parallel hardware execution, multiple operations are performed on separate data elements by one instruction, typically resulting in significant performance advantages.

Applications that can benefit from SIMD architectures include, for example, graphics, video, and image processing algorithms, and digital signal processing algorithms. These applications typically employ logical and/or mathematical operations on large data sets that can be scaled to SIMD widths to take advantage of the parallelism achieved through SIMD architectures. For example, image processing and graphics algorithms scale in terms of resolution (pixels per unit area) and pixel encoding (bits per pixel to represent intensity and color). Similarly, digitized samples taken from sensors and instrumentation in digital signal processing applications have scalable resolutions and data acquisition rates.

BRIEF DESCRIPTION OF DRAWINGS

The present invention is illustrated by way of example and not limitation in the figures of the accompanying drawings, in which like references indicate similar elements and in which.

DETAILED DESCRIPTION

Though SIMD architectures have significantly improved the performance of these applications, some operations may still require multiple instructions to obtain the desired result. One example of such an operation, commonly employed in graphics, image, and video processing applications, is a two-dimensional matrix multiplication.

For the purpose of the following discussion of embodiments, implementations, and examples, illustrative terms are used. For example, a computer system or data processing device or system may be understood to mean anyone of a variety of devices or systems for accessing data and/or communications. Examples include but are not limited to any combinations of one or more of the following: laptop computers, notebook computers; desktop computers, personal digital assistants, handheld computers, personal organizers; palmtop computers, pocket computers, cellular telephone/fax devices, game computers, digitizing tablet devices, electronic books, and digital video or digital audio recorder/players.

The term register refers to any device capable of storing and providing data. A register is not necessarily, included on the same die or in the same package as the processor.

Terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

It should be understood that the teachings disclosed herein may be used in a variety of applications. Although not limited in this respect, the circuits and techniques disclosed herein may be used in many apparatuses such as personal computers (PCs), wireless devices or stations, video or digital game devices or systems, image collection, processing, generation, and/or visualizing systems or display, digital display system, communication system, and the like.

Two-dimensional matrix multiplication operations can be implemented using a sequence of one-dimensional vector instructions, including, for example, vector shuffle/permute instructions, vector multiplication instructions, vector addition instructions, and/or vector multiply-add instructions. Such implementations typically require storing intermediate products, for example, in registers due to resource limitations and/or data dependencies prior to arriving at the final result.

Improved performance may be achieved through the use of a processing device including a matrix multiply-add unit operable to perform a two-dimensional ("2D") matrix multiply-add operation responsive to a single instruction. In one implementation, the 2D matrix multiply-add instruction operates on three 4×4 matrices of 32-bit integer or floating point data elements. Such an operation generates a 4×4 result matrix C such that:

C=C+A*B, where A, B, and C are 4×4 matrices.

Figure 1:
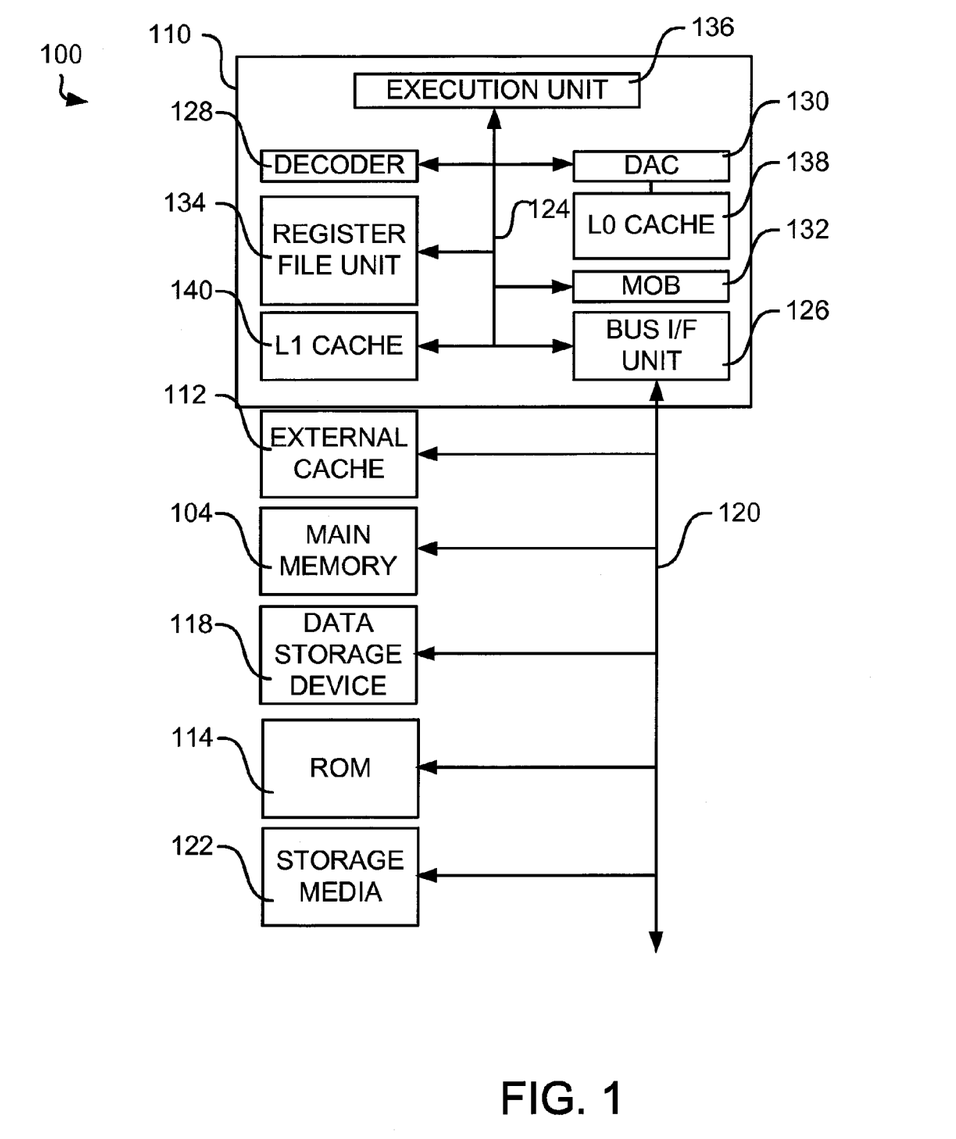
FIG. 1 shows a block diagram of a computing system.

Referring to FIG. 1, computer system 100 includes a processing unit 110, external cache 112, read-only memory (ROM) 114, and a main memory 104 coupled—via system bus 120—with processing unit 110, main memory 104 including, for example, any suitable type of random access memory (RAM). Processing unit 110 also has a data storage device 118 coupled therewith by system bus 120. Data storage device 118 comprises any suitable non-volatile memory, such as, for example, a hard disk drive. Computer system 100 further includes a removable storage media 122, such as a floppy disk drive, a CD ROM drive, and/or a USB Drive.

Processing unit 110 includes a number of components that are interconnected by one or more buses, and these buses are illustrated symbolically in FIG. 1 by a local bus 124. Local bus 124—and, hence, the components of processing unit 110—are coupled with a bus interface unit 126. Bus interface unit 126 couples processing unit 110 with system bus 120, enabling communication between processing unit 110 and main memory 104, as well as between processing unit 110 and an external cache 112.

Processing unit 110 includes an instruction decoder 128 coupled with local bus 124. Instruction decoder 128 receives an instruction (or instructions) associated with a program or piece of code executing on processing unit 110 and breaks the instruction down into one or more machine-level instructions/operations (uops). It should be understood that processing unit 110 may receive one or more instructions associated with a program, whereas another processing unit 110 of computer system 100 may receive one or more instructions associated with the same program. Accordingly, a program may be executing on multiple processing units 110.

Processing unit 110 further includes multiple execution units, including, for example, data access control unit (DAC) 130, memory-ordering buffer (MOB) 132, a register file unit 134, and functional execution unit 136.

Register file unit 134 includes a plurality of registers, each having 16, 32, 64, 128, 256, or 512 bits of storage. Further, register file unit 134 may include one or more register files, each having one or more registers. Execution unit 136 comprises one or more functional units, such as, for example, an arithmetic, logic, and/or floating-point unit. MOB 132 ensures the proper ordering of load and store instructions and, further, provides for the proper sequencing of these transactions within the memory hierarchy (i.e., the various levels of memory within computer system 100, including L0 cache 138, L1 cache 140, external cache 112, main memory 104, and data storage device 118). Each of the L0 cache 138 and L1 cache 140 stores data recently accessed, or expected to be accessed, by execution unit 136. One or more of the cache memories (e.g., L0 cache 138) may be coupled with DAC 130. DAC 130 controls all transactions that result in a cache miss, as well as other transactions that require special handling. If a uop corresponds to, for example, an arithmetic operation, that uop is dispatched to functional unit 136, which then performs the arithmetic operation. If a uop corresponds to a memory-referencing instruction—e.g., a load or a store—that uop is dispatched to MOB 132.

It should be understood that computer system 100 illustrated in FIG. 1 is intended to be an exemplar computer system and may include many additional components, which have been omitted for clarity. By way of example, the computer system 100 may include a DMA (direct memory access) controller, a network interface (e.g., a network card), a chip set associated with one or more of the processing units 110, as well as additional signal lines and buses. Also, it should be understood that computer system 100 may not include all of the components shown in FIG. 1.

Further, it should be understood that the processing unit 110 illustrated in FIG. 1 is intended to represent an exemplar processing device and, further, that such a processing unit may include many additional components that are not shown in these figures. These components having been omitted for ease of understanding. For example, the processing unit 110 may include an address generation unit, a reservation station, reorder buffer, scheduler, a segmentation and address translation unit, a translation lookaside buffer, a page miss handler, and/or internal clock circuitry. Also, although illustrated as discrete elements, it should be understood that many of the components shown in FIG. 1 may be combined and/or share circuitry. Most importantly, the embodiments described herein are not limited to any particular architecture or arrangement—as well as not being limited to any particular terminology used to describe such an architecture or arrangement—and the disclosed embodiments may be practiced on any type of processing device, irrespective of its architecture or the terminology ascribed to it.

Figure 2:
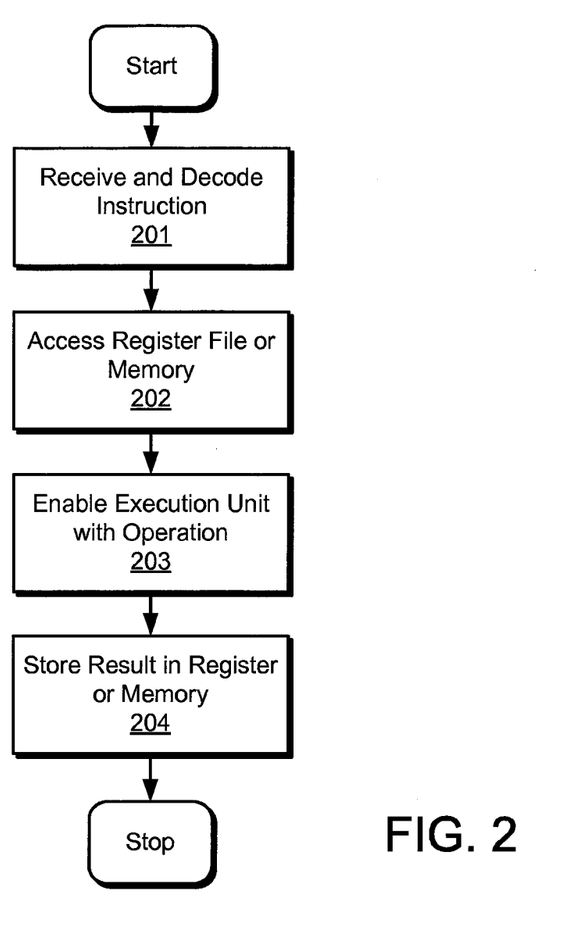
FIG. 2 is a flow diagram illustrating general processing steps performed by a processing device.

FIG. 2 is a flow diagram illustrating the general steps followed by processing unit 110 while performing matrix operations according to one implementation. At step 201, the decoder 128 receives an instruction from either cache 138, 140, 112 or bus 124. Decoder 128 decodes the instruction to determine the operations to be performed.

At step 202, decoder 128 accesses register file unit 134, or a location in memory 140, 112, 104, 118. Registers in register file unit 134, or memory locations in the memory, are accessed depending on the register address specified in the instruction. For example, for a 2D matrix multiply-add operation, the instruction includes SRC1, SRC2, SRC3, and DEST register addresses. SRC1 is the address of the first source register. SRC2 is the address of the second source register. SRC3 is the address of the third source register. DEST is the address of the destination register where the result data is stored. In some implementations, the storage location referenced by SRC 1 is also used to store the result data and is referred to as SRC1/DEST.

In some implementations, anyone, or all, of SRC1, SRC2, SRC3, and DEST, defines a memory location in the addressable memory space of processing unit 110. For example, SRC1 may identify a memory location in cache 140, while SRC2, SRC3, and DEST identify a first, second, and third register, respectively, in register file unit 134. For simplicity of the description herein, the embodiments will be described in relation to accessing register file unit 134. However, these accesses could be made to memory instead.

At step 203, execution unit 136 is enabled to perform the operation on the accessed data. At step 204, the result is stored back into register file unit 134 according to the requirements of the instruction.

Figure 3:
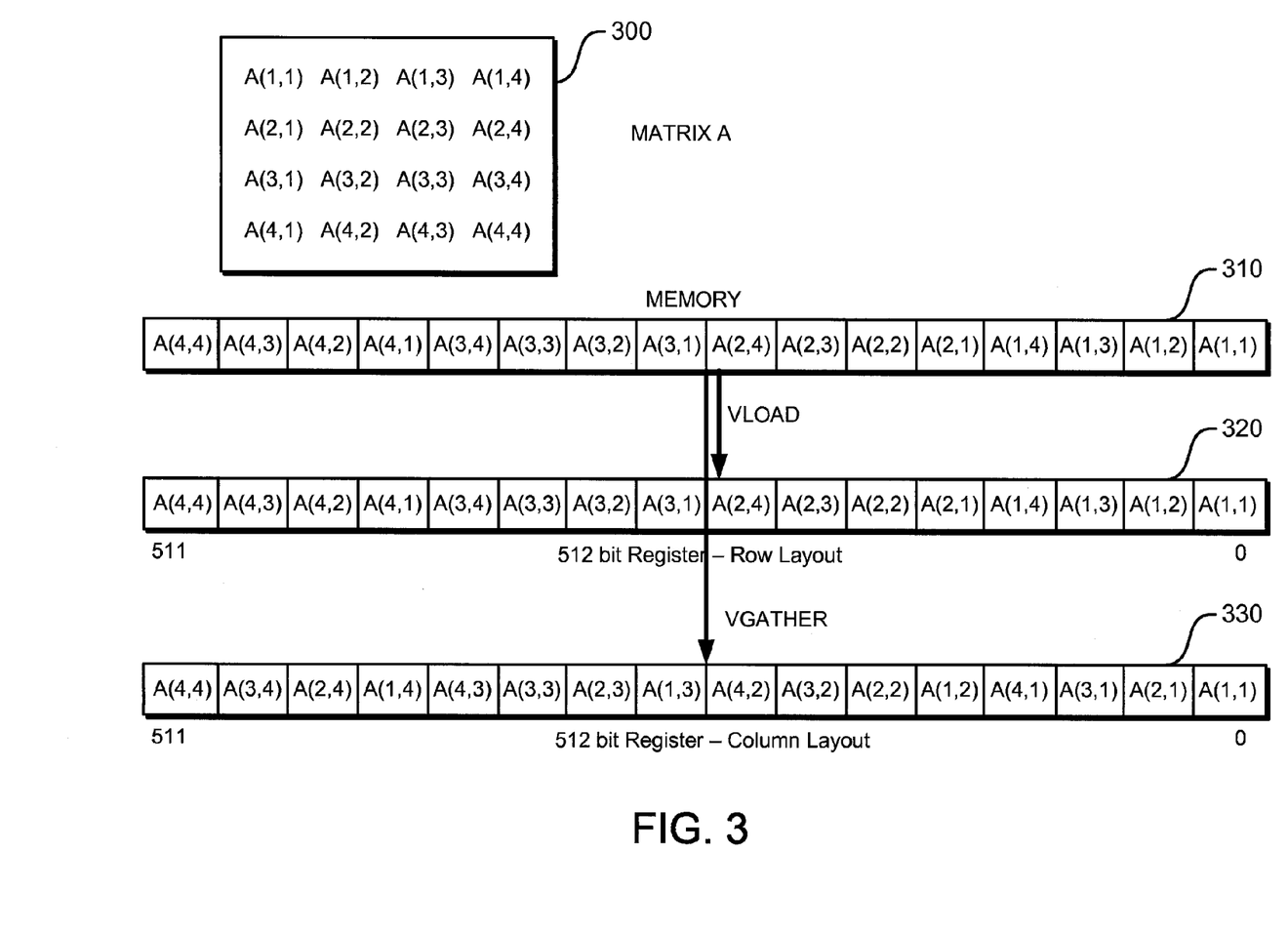
FIG. 3 illustrates a register storing a 4×4 matrix in a row ordered format and a register storing a 4×4 matrix in a column ordered format.

Referring now to FIG. 3, two exemplar data layouts are illustrated in which each register represents a 4×4 matrix 300 of scalar data elements (e.g., 32-bit integers, 32-bit single precision floating point, etc.). Matrix data elements are loaded (e.g., by a vector load or vload operation) into register 320 such that data elements from each row occupy adjacent storage locations within portions of register 320 (i.e., a row ordered format). For example, the first row in matrix 300 includes data elements A(1, 1), A(1, 2), A(1, 3), and A(1, 4) stored in memory 310. Responsive to a load operation, the data elements from the first row of the 4×4 matrix 300 are loaded/copied into register 320 such that A(1, 1) is stored in bits [31:0], A(1, 2) is stored in bits [63:32], A(1, 3) is stored in bits [95:64], and A(1, 4) is stored in bits [127:96]. The remaining rows are similarly loaded into register 320 in increasing bit order.

Alternatively, a vector gather or vgather operation stores data elements in a column format such that data elements from each column of matrix 300 occupy adjacent storage locations in portions of register 330 (i.e., a column ordered format). For example, the first column in matrix 300 includes data elements A(1, 1), A(2, 1), A(3, 1), and A(4, 1) stored in memory 310. Responsive to a gather operation, the data elements from the first column in matrix 300 are loaded/copied into register 330 such that A(1, 1) is stored in bits [31:0], A(2, 1) is stored in bits [63:32], A(3, 1) is stored in bits [95:64], and A(4, 1) is stored in bits [127:96]. Remaining columns are similarly loaded into register 330 in increasing bit order.

In this way, an m-by-m matrix of n-bit data elements are represented by a m^2×nbit register having matrix data elements stored in a row ordered format or a column ordered format (hereafter collectively referred to as "matrix vectors").

It is to be appreciated that storing the data elements in increasing bit order for the row and column ordered formats is one option and other variations are devised to correspond with the architecture and routing in a particular processing unit 110 and/or execution unit 136.

Figure 4:
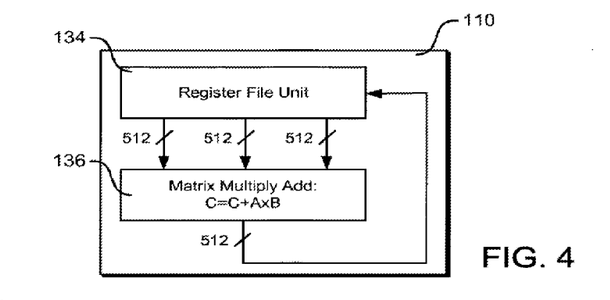
FIG. 4 is a data flow diagram illustrating the data interface in a processing device.

Referring now to FIG. 4, a data flow is illustrated for an implementation of a 2D matrix multiply-add operation. As illustrated, execution unit 136 of processing unit 110 is coupled to register file unit 134 to receive the matrix vectors from respective source registers. Execution unit 136 is a matrix multiply-add unit ("MMAU") operable to perform the 2D matrix multiply-add operation on data elements stored in registers specified by the first, second, and third source operands. After completion of the operation, the resultant matrix vector is written back to register file unit 134, for example, in a write back or retirement stage.

Figure 5:
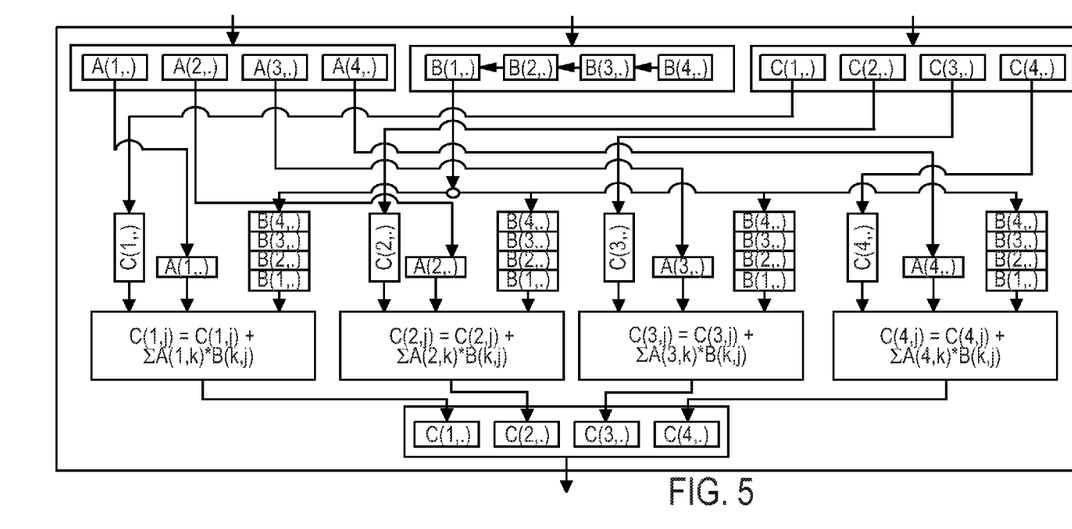
FIG. 5 illustrates an exemplar execution unit for performing a 2D matrix multiply-add operation.

Details of the MMAU are further illustrated in FIG. 5. As shown, the MMAU includes four identical sub-units ("lines"), each 128-bits wide for operating on data elements from each of the three matrix vectors. Each sub-unit multiplies one row of matrix A with each column of matrix B to generate a corresponding row of dot products. In some implementations, a multiply-add operation is performed to add the resultant dot product to a corresponding data element in matrix C. The result is then stored in the corresponding element of matrix D such that D=A*B+C.

Figure 6:
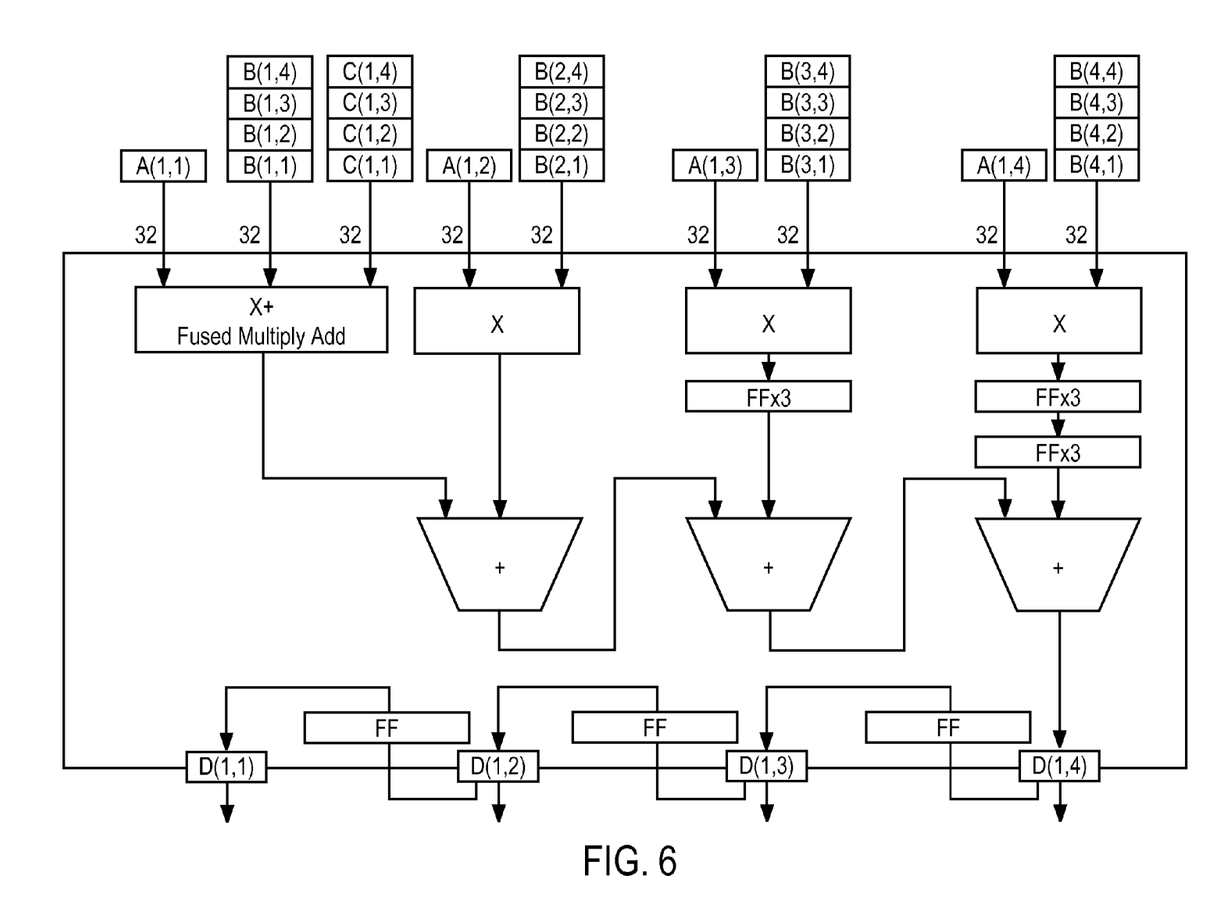
FIG. 6 illustrates an exemplar matrix multiply-add unit.

As illustrated in FIG. 6, some implementations include a fused multiply-add unit in each MMAU sub-unit. The sub-unit further includes three multipliers, and three adders. The sub-units also include horizontal routing to connect neighboring floating point adder units ("FAU") and write back horizontal routing. Flip flops ("FF") are implemented to synchronize the pipeline stages (e.g., while waiting for previous addition operations) and to synchronize the write back of the result vector.

In operation, an m-by-m matrix operation (where m is greater than one) is preceded by a vector load and/or gather operation in which a first storage location is loaded with a first vector representing an m-by-m matrix (A) of data elements in a row ordered format. In addition, a second storage location is loaded with a second vector representing an m-by-m matrix (B) of data elements in a column ordered format. Further, in some implementations, a third storage location is loaded with a third vector representing an m-by-m matrix (C) of data elements in a row ordered format. Responsive to receiving a single instruction specifying an m-by-m matrix operation for the set of vectors, decoder 128 in processing unit 110 decodes the single instruction and the decoded instruction is issued to an execution unit 136.

Responsive to the execution of a 4×4 matrix multiply-add operation, each MMAU sub-unit computes a row of the result matrix D to generate a portion of the row ordered result vector, where D=A*B+C. A first sub-unit generates a first result data element by computing:
D(1,1)=C(1,1)+[A(1,1)*B(1,1)+A(1,2)*B(2,1)+A(1,3)*B(3,1)+A(1,4)*B(4,1)].
The sub-unit then generates the second result data element by computing:
D(1,2)=C(1,2)+[A(1,1)*B(1,2)+A(1,2)*B(2,2)+A(1,3)*B(3,2)+A(1,4)*B(4,2)].
After that, the sub-unit computes:
D(1,3)=C(1,3)+[A(1,1)*B(1,3)+A(1,2)*B(2,3)+A(1,3)*B(3,3)+A(1,4)*B(4,3)], and finally, the sub-unit computes:
D(1,4)=C(1,4)+[A(1,1)*B(1,4)+A(1,2)*B(2,4)+A(1,3)*B(3,4)+A(1,4)*B(4,4)].

Similarly, sub-units 2, 3, 4 generate respective portions of the row ordered result vector.

In some implementations, a fused multiply-add operation is performed by each MMAU sub-unit to generate a first intermediate result, e.g., D(1,1), by multiplying a first data element of the first vector, A(1, 1), with a corresponding data element of the second vector, B(1,1), and adding a corresponding data element of the third vector, C(1,1). The remaining intermediate results, A(1,2)*B(2,1), A(1,3)*B(3,1), and A(1,4)*B(4,1), are generated by performing a multiply operation between corresponding data elements of the first and second vectors. The intermediate results are then added to generate the corresponding result data element.

In some implementations, the throughput of the MMAU is one matrix multiplication every four clock cycles, and the latency of the MMAU for one row of 32-bit floating point data elements is 15 cycles. Correspondingly, the latency for four rows (i.e., a full 4×4 matrix) is 18 cycles. The pipelined MMAU eliminates the need to store intermediate results in registers. Further, since all data shuffling is done inside the MMAU, no external permute or shuffle operation is required.

One or more embodiments include an article of manufacture that includes a tangible machine-accessible and/or machine-readable medium having stored thereon a SIMD instruction specifying a two-dimensional matrix multiply-add operation for a plurality of data elements, that if executed by a machine (e.g., an execution unit) causes the machine to multiply.

The tangible medium may include one or more solid materials. The medium may include, a mechanism that provides, for example stores, information in a form that is accessible by the machine. For example, the medium may optionally include recordable mediums, such as, for example, floppy diskette, optical storage medium, optical disk, CD-ROM, magnetic disk, magneto-optical disk, read only memory (ROM), programmable ROM (PROM), erasable-and-programmable ROM (EPROM), electrically-erasable- and-programmable ROM (EEPROM), random access memory (RAM), staticRAM (SRAM), dynamic-RAM (DRAM), Flash memory, and combinations thereof.

Suitable machines include, but are not limited to, execution units, general-purpose processors, special-purpose processors (e.g., graphics processors and cryptographic processors), cryptographic accelerators, network communications processors, computer systems, network devices, modems, personal digital assistants (PDAs), cellular phones, and a wide variety of other electronic devices with one or more execution units, to name just a few examples. Still other embodiments pertain to a computer system, embedded system, or other electronic device having an execution unit and/or performing a method as disclosed herein.

Figure 7:
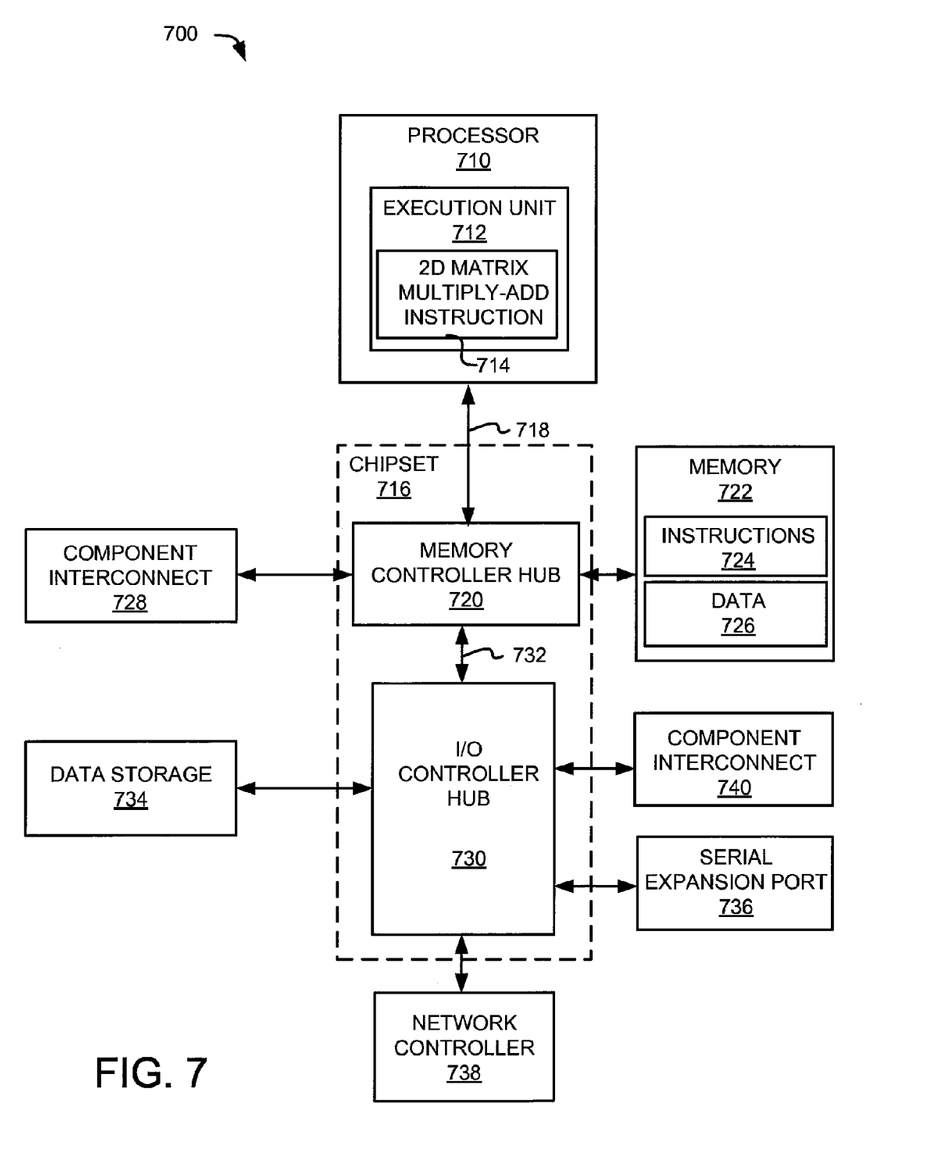
FIG. 7 illustrates a block diagram of a first exemplar computer system for implementing a 2D matrix multiply-add operation.

FIG. 7 illustrates an example of a suitable computer system 700 including a processor 710. The processor includes at least one execution unit 712 that is capable of executing at least one two-dimensional matrix multiply-add instruction 714.

The processor is coupled to a chipset 716 via a bus (e.g., a front side bus) or other interconnect 718. The interconnect may be used to transmit data signals between the processor and other components in the system via the chipset.

The chipset includes a system logic chip known as a memory controller hub (MCH) 720. The MCH is coupled to the front side bus or other interconnect 718.

A memory 722 is coupled to the MCH. In various embodiments, the memory may include a random access memory (RAM). DRAM is an example of a type of RAM used in some but not all computer systems. As shown, the memory may be used to store instructions 724, such as one or more 2D matrix multiply-add instructions, and data 726.

A component interconnect 728 is also coupled with the MCH. In one or more embodiments, the component interconnect may include one or more peripheral component interconnect express (PCIe) interfaces. The component interconnect may allow other components to be coupled to the rest of the system through the chipset. One example of such components is a graphics chip or other graphics device, although this is optional and not required.

The chipset also includes an input/output (I/O) controller hub (ICR) 730. The ICR is coupled to the MCR through hub interface bus or other interconnect 732. In one or more embodiments, the bus or other interconnect 732 may include a Direct Media Interface (DMI).

A data storage 734 is coupled to the ICH. In various embodiments, the data storage may include a hard disk drive, a floppy disk drive, a CD-ROM device, a flash memory device, or the like, or a combination thereof.

A second component interconnect 740 is also coupled with the ICH. In one or more embodiments, the second component interconnect may include one or more peripheral component interconnect express (PCIe) interfaces. The second component interconnect may allow various types of components to be coupled to the rest of the system through the chipset.

A serial expansion port 736 is also coupled with the ICH. In one or more embodiments, the serial expansion port may include one or more universal serial bus (USB) ports. The serial expansion port may allow various other types of input/output devices to be coupled to the rest of the system through the chipset.

A few illustrative examples of other components that may optionally be coupled with the ICH include, but are not limited to, an audio controller, a wireless transceiver, and a user input device (e.g., a keyboard, mouse).

A network controller 738 is also coupled to the ICH. The network controller may allow the system to be coupled with a network.

In one or more embodiments, the computer system may execute a version of the WINDOWS™ operating system, available from Microsoft Corporation of Redmond, Wash. Alternatively, other operating systems, such as, for example, UNIX, Linux, or embedded systems, may be used.

This is just one particular example of a suitable computer system. For example, in one or more alternate embodiments, the processor may have multiple cores. As another example, in one or more alternate embodiments, the MCH 720 may be physically integrated on-die with the processor 710 and the processor may be directly coupled with a memory 722 through the integrated MCH. As a further example, in one or more alternate embodiments, other components may be integrated on-die with the processor, such as to provide a system-on-chip (SoC) design. As yet another example, in one or more alternate embodiments, the computer system may have multiple processors.

Figure 8:
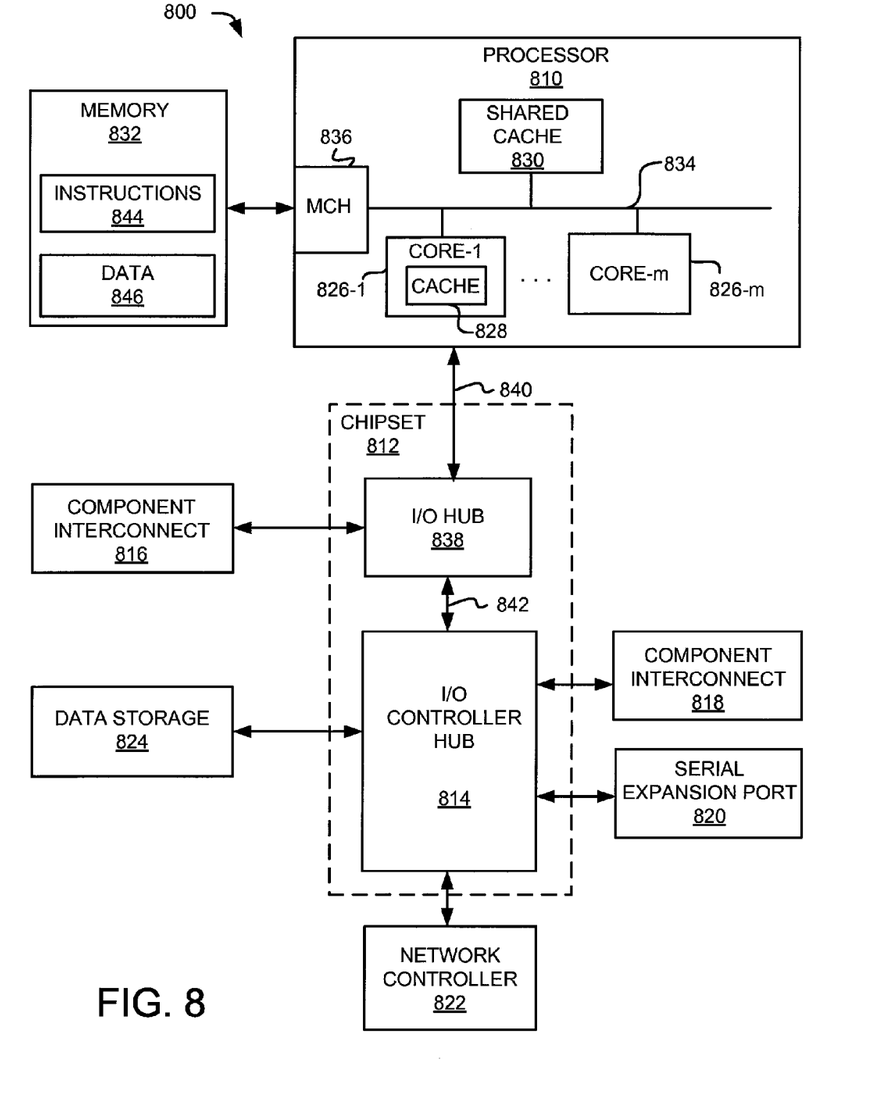
FIG. 8 illustrates a block diagram of a second exemplar computer system for implementing a 2D matrix multiply-add operation.

FIG. 8 is another example of a suitable computer system 800. The second example embodiment has certain similarities to computer system 700 described above. For clarity, the discussion will tend to emphasize the differences without repeating all of the similarities.

Similar to computer system 700, computer system 800 includes a processor 810, and a chipset 812 having an I/O controller hub (ICH) 814. Computer system 800 also includes a first component interconnect 816 coupled with chipset 812, a second component interconnect 818 coupled with the ICH, a serial expansion port 820 coupled with the ICH, a network controller 822 coupled with the ICH, and a data storage 824 coupled with the ICH.

Processor 810 is a multi-core processor and includes processor cores 826-1 through 826-M, where M may be an integer number equal to or larger than two (e.g. two, four, seven, or more). Each core may include at least one execution unit that is capable of executing at least one embodiment of an instruction as disclosed herein. As shown, the core-1 includes a cache 828 (e.g., an L1 cache). Each of the other cores may similarly include a dedicated cache. The processor cores may be implemented on a single integrated circuit (IC) chip.

The processor also includes at least one shared cache 830. The shared cache may store data (e.g., instructions) that are used by one or more components of the processor, such as the cores. For example, the shared cache may locally cache data stored in a memory 832 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof.

The processor cores and the shared cache are each coupled with a bus or other interconnect 834. The bus or other interconnect may couple the cores and the shared cache and allow communication.

The processor also includes a memory controller hub (MCR) 836. As shown in this example embodiment, the MCH is integrated with the processor 810. For example, the MCH may be on-die with the processor cores. The processor is coupled with the memory 832 through the MCH. In one or more embodiments, the memory may include DRAM, although this is not required.

The chipset includes an input/output (I/O) hub 838. The I/O hub is coupled with the processor through a bus (e.g., a QuickPath Interconnect (QPI)) or other interconnect 840. The first component interconnect 816 is coupled with the I/O hub 838.

This is just one particular example of a suitable system. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or an execution unit as disclosed herein are generally suitable.

In the description above, for the purposes of explanation, numerous specific details have been set forth in order to provide a thorough understanding of the embodiments. It will be apparent however, to one skilled in the art, that one or more other embodiments may be practiced without some of these specific details. The particular embodiments described are not provided to limit the invention but to illustrate embodiments of the invention. The scope of the invention is not to be determined by the specific examples provided above but only by the claims below. In other instances, well-known circuits, structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

Certain operations may be performed by hardware components, or may be embodied in machine-executable instructions, that may be used to cause, or at least result in, a circuit or hardware programmed with the instructions performing the operations. The circuit may include a general-purpose or special-purpose processor, or logic circuit, to name just a few examples. The operations may also optionally be performed by a combination of hardware and software. An execution unit and/or a processor may include specific or particular circuitry or other logic responsive to a machine instruction or one or more control signals derived from the machine instruction to store an instruction specified result operand.

It should also be appreciated that reference throughout this specification to "one embodiment", "an embodiment", or "one or more embodiments", for example, means that a particular feature may be included in the practice of embodiments of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

Thus, a technique for performing a 2D matrix multiply-add operation is described. It is appreciated that the instructions and implementations described herein are used in other capacities as well and need not be limited to graphic, video or image processing algorithms, and/or digital signal processing algorithms. For example, the 2D matrix multiply-add instructions may be used in digest, hashing, and encoding algorithms used for security, data corruption protection, and data loss protection such as simple parity, CRC (Cyclic Redundancy Check), MD5 (Message Digest Algorithm 5), SHA (Secure Hash Algorithm), Galois math, Reed-Solomon encoding, and Cypher-Block-Chaining which all make use of logical and mathematical operators over blocks of data, often many Kilobytes in size. Similarly, the 2D matrix multiply-add operation may be used in the simulation of physical systems that involve data transformation over time and/or include grids of data that are transformed. For example, in physical thermodynamic, mechanical, fluid-dynamic or electrical-field models a grid of floating point values are often used to represent the physical fields as finite elements. These finite element grids are then updated through mathematical transformations over time to simulate a physical process. Accordingly, other embodiments are within the scope of the following claims.

What is claimed is:

1. A method comprising:
    decoding by a decoder in a processor device, a single instruction specifying an m-by-m matrix operation for a set of vectors, wherein the set of vectors comprises a first vector, a second vector, and a third vector, wherein each vector represents an m-by-m matrix of data elements and m is greater than one, wherein the m-by-m matrix operation is a multiply-add operation;
    issuing the single instruction for execution by an execution unit in the processor device; and
    responsive to the execution of the single instruction, generating a fourth vector, wherein the fourth vector is stored separately from the first, second, and third vectors, wherein the fourth vector represents an m-by-m matrix of data elements, wherein the execution of the single instruction is performed by m sub-circuits, wherein each of the sub-circuits includes a plurality of multipliers and adders connected in a series, output of the last of the series connecting to a plurality of delay lines to generate respective portion of the fourth vector.

2. The method of claim 1, wherein the first vector represents an m-by-m matrix of data elements stored in a row ordered format, the second vector represents an m-by-m matrix of data elements stored in a column ordered format, and the third vector represents an m-by-m matrix of data elements stored in a row ordered format.

3. The method of claim 1, wherein generating the fourth vector comprises:
    multiplying data elements corresponding to a first row in the first vector with data elements corresponding to a first column in the second vector to generate a set of intermediate results; and
    adding the set of intermediate results to generate a first result data element.

4. The method of claim 3, wherein the set of intermediate results comprises a first intermediate result, a second intermediate result, a third intermediate result, and a fourth intermediate result, and wherein multiplying data elements corresponding to the first row in the first vector with data elements corresponding to the first column in the second vector to generate the set of intermediate results comprises:
    performing a fused multiply-add operation to generate the first intermediate result by multiplying a first data element of the first vector with a corresponding data element of the second vector, and adding a corresponding data element of the third vector; and
    performing a multiply operation to generate the second, third, and fourth intermediate results.

5. The method of claim 3, wherein m equals four and wherein generating the fourth vector further comprises:
    multiplying data elements corresponding to a second row in the first vector with data elements corresponding to a first column in the second vector to generate a second set of intermediate results;
    multiplying data elements corresponding to a third row in the first vector with data elements corresponding to a first column in the second vector to generate a third set of intermediate results; and
    multiplying data elements corresponding to a fourth row in the first vector with data elements corresponding to a first column in the second vector to generate a fourth set of intermediate results.

6. The method of claim 5, wherein generating the resultant vector further comprises:
    adding the second set of intermediate results to generate a second result data element;
    adding the third set of intermediate results to generate a third result data element; and
    adding the fourth set of intermediate results to generate a fourth result data element;
    wherein the first, second, third, and fourth result data elements represent a first row of data elements in the m-by-m matrix represented by the resultant vector.

7. A processor device comprising:
    a storage location configured to store a first set of data elements, a second set of data elements, and a third set of data elements, wherein the first, second, and third sets of data elements represent respective m-by-m matrices and m is greater than one;

a decoder configured to decode a single instruction specifying an m-by-m matrix multiply-add operation and an execution unit coupled to the decoder to receive decoded instructions and coupled to the storage location to execute the m-by-m matrix multiply-add operation, the execution unit including m sub-circuits, wherein each of the sub-circuits includes a plurality of multipliers and adders connected in a series, output of the last of the series connecting to a plurality of delay lines to generate respective portion of a fourth set of data elements;

wherein the fourth set of data elements representing an m-by-m result matrix, the fourth set of data elements being stored separately from the first, second, and third sets of data elements.

8. The processor device of claim 7, wherein m is equal to four.

9. The processor device of claim 7, wherein
the plurality of multipliers are configured to multiply data elements corresponding to a row in a first m-by-m matrix represented by the first set of data elements with data elements corresponding to a column in a second m-by-m matrix represented by the second set of data elements.

10. The processor device of claim 9, wherein the plurality of multipliers comprise a fused multiply-add unit configured to multiply a data element from the first set of data elements with a data element from the second set of data elements to generate an intermediate result and to add a data element from the third set of data elements to the intermediate result.

11. The processor device of claim 7, wherein the plurality of adders are configured to add a plurality of intermediate results to generate a first result data element.

12. A system comprising:
a memory controller coupled to a first storage location configured to store a first set of data elements; and a processor coupled to the memory controller, the processor comprising:

a register file unit configured to store a second set of data elements, and a third set of data elements, wherein the first, second, and third sets of data elements represent respective m-by-m data matrices;

a decoder configured to decode a single instruction specifying an m-by-m matrix multiply-add operation and an execution unit coupled to the decoder to receive decoded instructions and coupled to the first storage location and register file unit to execute the m-by-m matrix multiply-add operation, the execution unit including m sub-circuits, wherein each sub-circuit includes a plurality of multipliers and adders connected in a series, output of the last of the series connecting to a plurality of delay lines to generate respective portion of a fourth set of data elements;

wherein the fourth set of data elements representing an m-by-m result matrix, the fourth set of data element being stored separately from the first, second, and third sets of data elements.

13. The system of claim 12, wherein m is equal to four.

14. The system of claim 12, wherein the sub-circuits are operable to generate a respective portion of the fourth set of elements, each portion representing a row of the m-by-m result matrix.

15. The processor device of claim 14, wherein
the plurality of multipliers are configured to multiply data elements corresponding to a row in a first m-by-m matrix represented by the first set of data elements with data elements corresponding to a column in a second m-by-m matrix represented by the second set of data elements.

* * * * *